United States Patent [19]

Silvestri, Jr.

[11] 4,352,270

[45] Oct. 5, 1982

[54] METHOD AND APPARATUS FOR PROVIDING PROCESS STEAM OF DESIRED TEMPERATURE AND PRESSURE

[75] Inventor: George J. Silvestri, Jr., Upper Chichester, Pa.

[73] Assignee: Westinghouse Electric Corp., Pittsburgh, Pa.

[21] Appl. No.: 163,043

[22] Filed: Jun. 26, 1980

[51] Int. Cl.³ ............................................. F01K 17/00
[52] U.S. Cl. ........................................ 60/648; 60/653; 60/677
[58] Field of Search ................. 60/648, 653, 677, 679, 60/663

[56] References Cited

U.S. PATENT DOCUMENTS 3,979,914  9/1976  Weber .............................. 60/653 X
4,214,451  7/1980  Coombes et al. ...................... 60/648
4,272,962  6/1981  Viscovich et al. .................... 60/648

Primary Examiner—Allen M. Ostrager
Assistant Examiner—Stephen F. Husar
Attorney, Agent, or Firm—F. J. Baehr, Jr.

[57] ABSTRACT

A method and apparatus for extracting steam from a steam turbine and adjusting the temperature and pressure for a process. Steam is extracted from the first section of the turbine and is throttled to a desired pressure for use in the process. After the extracted steam is throttled it is transmitted to a suction port of a jet pump. If the pressure of the extracted steam entering the jet pump suction port is less than the desired process pressure, high pressure steam is routed to an inlet port of the jet pump. Steam leaving the jet pump may be desuperheated. Regulation of the steam flow between the first and second section turbines increased extraction pressure. At some point total efficiency of turbine operation and process operation can be improved by extracting steam from a second, higher pressure extraction location. Such extracted steam is throttled to the desired pressure and transmitted from the second pressure reducing station to a second jet pump along with steam from the second extraction location, as the steam flow rate from the first to the second section turbine is increased.

4 Claims, 1 Drawing Figure

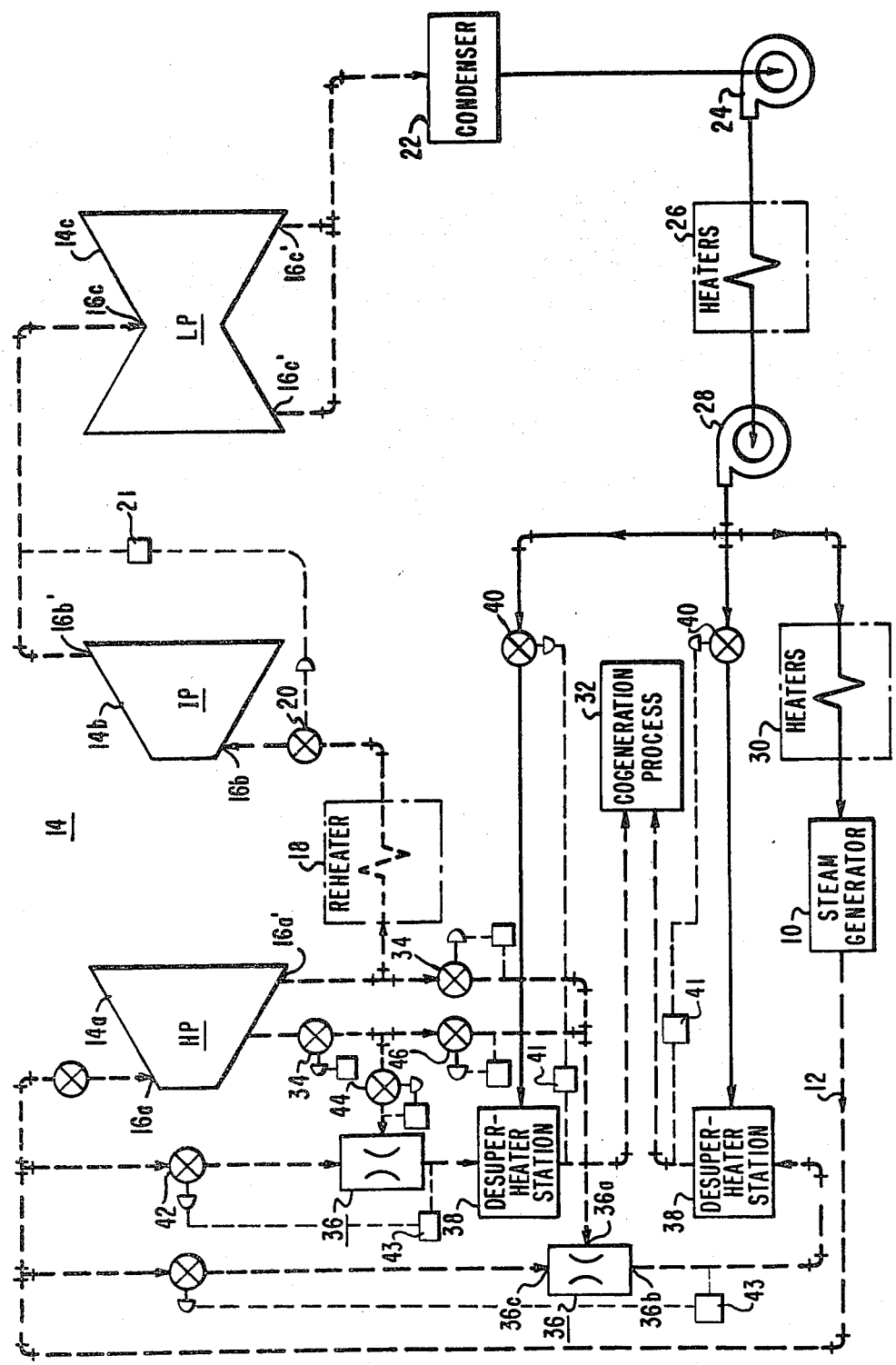

METHOD AND APPARATUS FOR PROVIDING PROCESS STEAM OF DESIRED TEMPERATURE AND PRESSURE

BACKGROUND OF THE INVENTION

1. Field of the Invention

This invention relates to cogeneration cycles for reheat turbines, and more particularly, to means for adjusting the temperature and pressure of steam extracted from a turbine power cycle having a steam reheater.

2. Description of the Prior Art

Cogeneration applications in which process steam is removed from a power generation turbine cycle has become increasingly popular as energy has become increasingly scarce and expensive. Cogeneration applications have typically been applied to steam turbine cycles having no reheat of the steam during its expansion through the turbine.

Power generation turbines usually constitute multiple fluidly communicating sections or cylinders. Steam reheaters are most frequently arranged to receive steam from a first turbine section exhaust port and discharge the reheated steam to a second turbine section inlet port. Process steam requirements often include pressures in the range of 400–700 psi. When reheat turbines are used, the first or high pressure turbine section usually exhausts at a pressure of 520–600 psi rated turbine load for throttle pressures in the range of 1800–2400 psi. Additionally, the steam pressure at the second or intermediate pressure turbine section inlet falls within the range of 470–540 psi at rated turbine load. The aforementioned steam pressure ranges have been found to constitute thermodynamically optimum values for reheat turbines. As can be seen, the high pressure turbine section exhaust and intermediate pressure turbine section inlet respectively have typical pressures which fall very close to the usual 700 and 400 psi process steam requirements. Additionally, extraction flow from the turbine causes a drop in the extraction pressure so as to necessitate integral steam chests and valves just after or downstream from the extraction points so as to maintain the desired extraction pressure for the process steam. Inclusion of such integral steam chests and valves increases the turbine length, complexity and cost while concomitantly reducing the turbine efficiency due to the inherent pressure losses when the extraction flow requirement to the process is zero. As such, providing cogeneration with a reheat turbine cycle has, in the past, required a more complex and costly turbine whose efficiency was reduced when the process steam flow requirement was zero.

SUMMARY OF THE INVENTION

In accordance with the present invention, an apparatus and method are provided for supplying process steam at a desired temperature and pressure from a reheat turbine cycle in a simple and inexpensive manner. The apparatus generally comprises a turbine apparatus having a first section and a second section through which steam serially expands, a steam reheater for reheating the steam exhausting from the first section prior to its entry into the second section, an interceptor valve for regulating steam flow from the reheater into the second turbine section, means for transmitting steam to the first turbine section for expansion therethrough, a throttling valve for reducing the pressure of steam extracted from a first location in the first turbine section, a jet pump for increasing the pressure of steam extracted from the first location, a mixing chamber for combining the extracted steam with water to adjust the temperature of the steam, a fluid utilizing means, and means for fluidly connecting the mixing means with the fluid utilizing means.

The invention may be practiced by supplying steam to a first turbine section, expanding the steam through the first and second serially connected turbine sections, reducing the pressure of steam extracted from a first location on the first turbine section at a first pressure reducing station from an extraction pressure to a predetermined pressure, decreasing the extracted steam flow rate from the first to the second turbine section when the extraction pressure is less than the predetermined pressure and the temperature of steam exhausting from the first turbine section is less than a limiting temperature, transmitting steam from the first pressure reducing station to a suction port on a jet pump, transmitting steam supplied to the first turbine section to an inlet port on the jet pump when the steam pressure leaving the first pressure reducing station is less than the predetermined pressure, transmitting steam entering the jet pump's inlet and suction ports through an outlet port on the jet pump, desuperheating the steam transmitted through the outlet port at a desuperheating station when the temperature of the steam transmitted through the outlet port is greater than a predetermined temperature, and transmitting the steam from the desuperheating station to a steam utilizing apparatus. An interceptor valve is used to decrease steam flow from the first to the second turbine section so as to maintain the extraction pressure at the desired predetermined pressure. At some degree of interceptor valve closure the total efficiency of the turbine cycle and steam utilizing process can be improved by extracting steam from a second location upstream from the first extraction location, throttling that steam to the predetermined pressure, routing that steam to the jet pump suction port, and increasing the steam flow rate through the interceptor valve so as to reduce thermodynamically irreversible throttling by the interceptor valve.

BRIEF DESCRIPTION OF THE DRAWINGS

The invention will be more fully understood from the following detailed description of a preferred embodiment, taken in connection with the accompanying drawings, in which:

The sole FIGURE is a schematic view of a cogeneration system including a reheat steam turbine and a process to which steam is supplied from the turbine.

DESCRIPTION OF THE PREFERRED EMBODIMENT

The present invention is concerned primarily with a method and apparatus for extracting steam from a turbine apparatus having a steam reheater utilized in combination therewith. Accordingly, in the description which follows, the invention is shown embodied in a power generation steam cycle. It should be understood, however, that the invention may be utilized in any system utilizing extraction steam.

The invention is shown, by way of illustration, in the sole FIGURE, disposed in operating position within a reheat power generation steam cycle. Steam is supplied by steam generator 10 through transmission line 12 to a multisection turbine apparatus 14 which includes a first or high pressure section 14a, a second or intermediate pressure section 14b, and a third or low pressure section 14c. Most of the steam transmitted to inlet port 16a of turbine section 14a is exhausted through exhaust port 16a' from which the steam passes through steam reheater 18 where the steam's temperature is increased. Reheated steam from steam reheater 18 is routed through interceptor valve 20 prior to entry into turbine section 14b through inlet port 16b. After exhausting from exhaust port 16b', the steam enters inlet port 16c and expands through turbine section 14c through exhaust port 16c'. The steam is then condensed in condenser 22 and the condensate is pumped forward by hot well pump 24 through a series of low pressure feedwater heaters 26. Boiler feedpump 28 receives heated water from the low pressure heaters 26 and transmits most of that water through high pressure heaters 30 to steam generator 10 to vaporize the heated water.

A cogeneration process 32 requires at least one and, in the illustrated case, sometimes two steam pressures and temperatures. Typical values for process steam pressure requirements are 400 to 700 pounds per square inch. The first or low pressure extraction location is at the first turbine section's exhaust and is nominally 400 psi while the higher pressure or second extraction location for the process is upstream from the first location in turbine section 14a and has a nominal extraction pressure of 700 psi. To avoid some of the redundancy and complexity from an explanation on how the individual extractions are performed and interact, only the first location will be intimately described. During the time when there is no demand for process steam, interceptor valve 20 is generally held in the completely open, unobstructing position so as to permit maximum steam flow through the turbine with minimum throttling and maximum efficiency. When low pressure (400 psi) steam is demanded by the process, steam extracted from the first extraction location (high pressure turbine section's exhaust) is throttled with throttling valve 34 if its pressure is greater than 400 psi. As the high pressure turbine section exhaust (also called cold reheat) pressure drops (such as from decreased turbine load, increased upstream steam extraction, or otherwise) throttling valve 34 is progressively opened to decrease the pressure reduction.

When throttling valve 34 is completely open and the cold reheat steam pressure falls below that required by the process, interceptor valve 20 is modulated to increase the cold reheat steam pressure so as to provide the pressure required by the process. Due to limiting design temperature restrictions on equipment components constituting portions of turbine section 14a, further restrictive movement of interceptor valve 20 can cause that limiting temperature to be surpassed so a temperature and pressure sensor 21 operates to control the intercept valve 20. Steam from the first extraction location (cold reheat) is transmitted through jet pump 36 from jet pump suction port 36a to discharge port 36b. Steam from the jet pump discharge port 36b is transmitted to desuperheater station 38 which provides means for mixing relatively cold feedwater from boiler feedpump 28 with the extracted steam from the first location so as to remove excessive superheat therefrom which is not desired by the process 32. Valve 40 or other pressure regulating means is controlled by temperature sensor 41 and provides precise adjustment of the feedwater flow rate to desuperheater station 38. The fluid entering desuperheater station 38 (first location extraction steam and feedwater, if any) has the desired process pressure and the fluid leaving desuperheater station 38 has the desired temperature as well, and is thus transmitted to process 32.

During cogeneration operation (simultaneous operation of power generation turbine 14 and process 32), material imposed temperature restrictions on components of turbine section 14a preclude flow restrictive movement of interceptor valve 20 beyond a predetermined extent. When interceptor valve has been closed to such predetermined extent and the extractor pressure is below the desired predetermined pressure, high pressure steam valve 42 is opened so as to transmit steam from the throttle of turbine 14 to an inlet port 36c of jet pump 36. During expansion through jet pump 36, the high pressure steam mixes with steam from the first extraction location and raises its pressure. Suitable regulation of valve 42 provides the desired pressure of steam exiting discharge port 36b and is controlled by the pressure regulator 43.

A further possible operating mode for the aforementioned cogeneration occurs during modulation of interceptor valve 20 to maintain the desired extraction pressure. Beyond some degree of interceptor valve modulation, the cogeneration system efficiency may be improved by throttling high pressure steam extracted from a high pressure extraction location disposed relatively upstream from the first extraction location to the predetermined pressure. At such time pressure regulating valve 34 on an upstream (second) extraction location is opened while pressure regulation valve 44 on the same extraction location is maintained in the closed position and bypass pressure regulation valve 46 is opened a sufficient amount to provide the required steam flow and pressure for the process 32. When valve 46 is opened, pressure regulating valve 34 on the first extraction location is preferably closed. For all modes of operation in which the extraction can be maintained at or above that required by the process, interceptor valve 20 is maintained in an open, unrestricted flow configuration.

If high pressure process steam is required by process 32 rather than low pressure process steam, pressure regulating valve 34 on the first extraction location is closed and the aforementioned process is enacted on the second or high pressure extraction location.

It will now be apparent that a cogeneration system and method of operation of such cogeneration system has been provided in which extraction pressure and temperature are precisely controlled without additional steam chests being supplied in the turbine sections. Elimination of such additional steam chests reduce turbine costs and increase turbine efficiency during operation of the turbine apparatus 14 only. By using the aforementioned cogeneration system, standard components such as turbine section 14a and 14b may be used with steam reheater 18 and thus avoid more expensive turbine components and the inefficiencies resulting from use of additional steam chests. Furthermore, flexiblity in supplying the required steam and the precise control capability for maintaining its temperature and pressure to process 32 is inherent.

What we claim is:

1. A cogeneration system comprising:
a turbine apparatus having a first section and a second section, said first section having an inlet port and exhaust port, said second section having an inlet port;

means for fluidly connecting the first turbine section's exhaust port with the second turbine section's inlet port, said fluid connecting means including means for reheating the steam exhausting from the first turbine section's exhaust port prior to its entry into the second turbine section's inlet port, said fluid connecting means further including means for regulating steam flow through said reheating means;

means for generating steam;

means for transmitting steam from said steam generating means to said first turbine section's inlet port;

means for reducing the pressure of steam extracted from said first turbine section's exhaust port;

means for increasing the pressure of steam extracted from said turbine apparatus;

means for mixing steam extracted from said turbine apparatus with selected water flow rates;

means for utilizing said steam from said mixing means; and means for fluidly connecting said mixing means and said steam utilizing means.

2. The cogeneration system of claim 1, said steam pressure increasing means comprising:

a jet pump having an inlet port in fluid communication with said steam transmitting means, a suction port in fluid communication with said exhaust port, and an outlet port in fluid communication with said mixing means; and means for regulating steam flow from said steam transmitting means to said jet pump's inlet port.

3. A method for operating a cogeneration system comprising the steps of:

supplying steam to an inlet port on a first turbine section;

expanding the steam through the first and a second serially connected turbine sections;

reducing the pressure of steam extracted from a first location of the first turbine section to a predetermined pressure at a first pressure reducing station;

decreasing the steam flow rate from said first to said second turbine section when said exhaust pressure and temperature are less than said predetermined pressure and a limiting temperature, respectively;

transmitting steam from said first pressure reducing station to a suction port on a jet pump;

providing steam supplied to said first turbine section to an inlet port on said jet pump when the steam pressure leaving said first pressure reducing station is less than said predetermined pressure;

transmitting steam entering said jet pump's inlet and suction ports through an outlet port on said jet pump;

desuperheating the steam transmitted through said jet pump's outlet port at a desuperheating station when the temperature of said steam transmitted through said jet pump's outlet port is greater than a predetermined temperature; and transmitting the steam from the desuperheating station to a steam utilizing apparatus.

4. The method of operating a cogeneration system as set forth in claim 3, and further comprising the steps of:

extracting steam from a second location upstream relative to the first location;

reducing the pressure of steam extracted from the second location to the predetermined pressure at a second pressure reducing station;

transmitting the steam from said second pressure reducing station to the jet pump suction port; and increasing the steam flow rate from said first to said second turbine section, said preceding steps being performed when greater combined efficiency of operation of the turbine and steam utilizing apparatus is desired.

* * * * *